June 24, 1941. F. E. RICE 2,247,099
FAUCET
Filed June 16, 1939
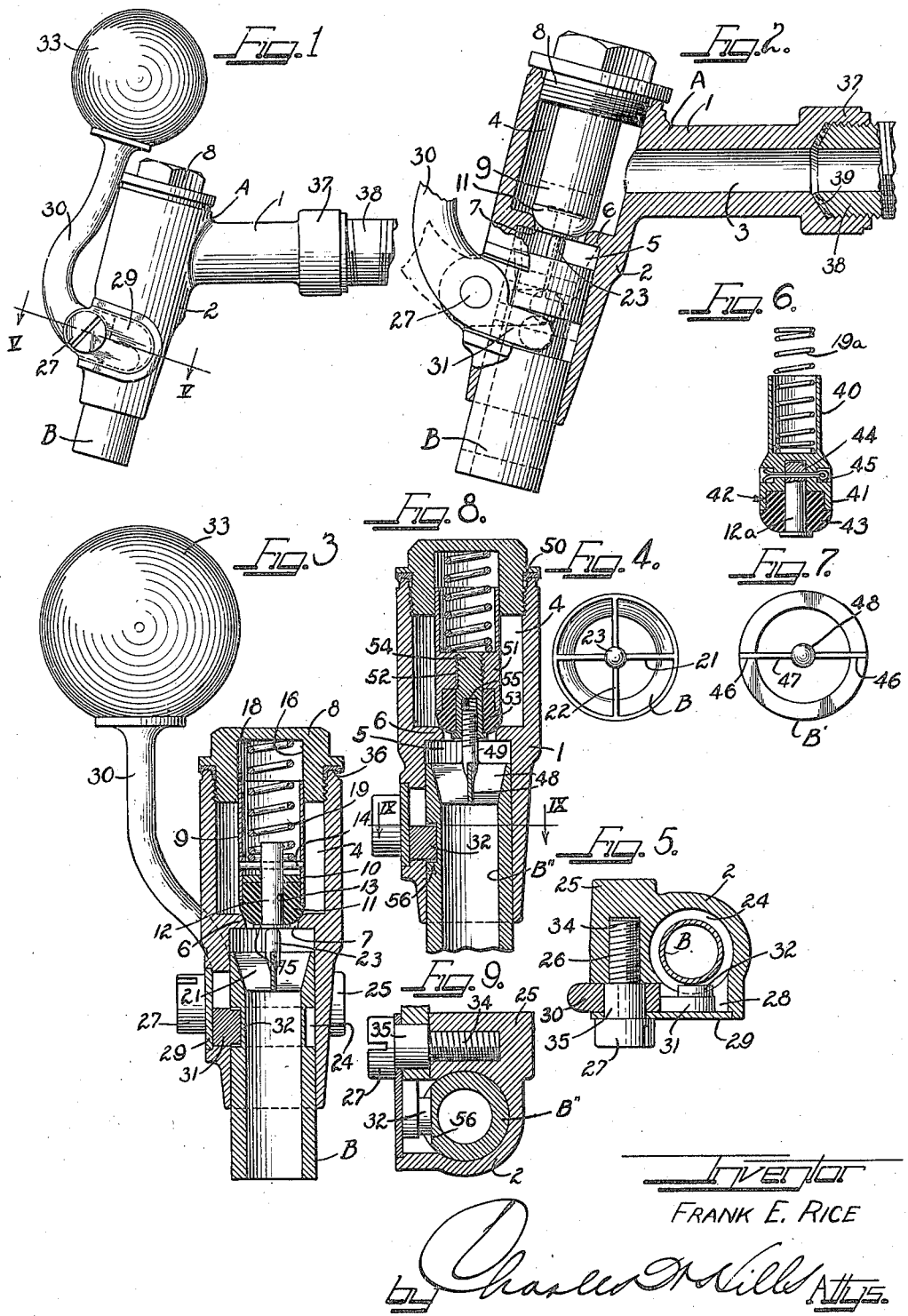
Inventor
FRANK E. RICE Patented June 24, 1941

2,247,099

UNITED STATES PATENT OFFICE 2,247,099

FAUCET

Frank E. Rice, Detroit, Mich.

Application June 16, 1939, Serial No. 279,464

2 Claims. (Cl. 251—8)

The present invention relates to faucets and more particularly to beer faucets arranged for quick opening and closing action.

An object of the present invention is to provide a faucet particularly adapted for the purpose of dispensing beer and one which may be manufactured in quantity lots at low manufacturing costs to be sold on a competitive basis.

Another object of the present invention is to provide a beer faucet construction in which but few parts are utilized and so designed and arranged that the cost of machining the faucet is reduced to a minimum.

A further object of the present invention is to provide a beer faucet in which the nozzle member is shiftable, which shifting movement is utilized to open the valve.

A further object of the present invention is to provide a beer faucet in which the valve stem is guided in a cap which closes the chamber in which the valve operates.

A further object of the invention consists in providing the shiftable nozzle with an annular groove formed in its exterior, in which groove projects a head carried by the lever supporting the ball handle, utilized for shifting the nozzle to open the valve.

The invention has for an additional object the provision of a shiftable nozzle member provided with a projection adapted to engage the valve member to unseat it when the nozzle is shifted in one direction.

Generally speaking, the faucet of the present invention comprises a body having a horizontal portion for connection to the source of beer, an inclined forwardly and downwardly extending portion in which is a chamber communicating with the passage through the horizontal portion, and also in which is a passageway in which the nozzle member is reciprocable. A valve seat is interposed between the chamber and the passageway, forming an annular valve opening. The valve works within the chamber and is carried by a stem which is guided by the cap which closes the end of the chamber remote from the valve seat. The nozzle member is given reciprocable movement by swinging movement of the lever carrying the usual ball handle. The parts as constructed are simple in relationship and design so that the same may be quickly and easily machined without involving expensive labor costs. The valve stem and valve member and parts as well as the nozzle member, may be made on screw machines thus reducing the cost of manufacture of these parts.

The above, other and further objects of the present invention will be apparent from the following description and accompanying drawing.

The accompanying drawing illustrates embodiments of the present invention, and the views thereof are as follows:

Figure 1 is a side elevational view of a beer faucet of the present invention with the handle and nozzle member in positions occupied when the valve is closed.

Figure 2 is a central section through the faucet body showing certain parts in elevation, illustrating the valve in seated relation and the nozzle member in its normally projected position. The dotted lines show the nozzle member moved inwardly and the valve unseated.

Figure 3 is an axial view or section taken through the inclined portion of the body, showing the valve as seated, the nozzle member in its normally projected position, and also showing the manner of guiding the valve stem by the cap.

Figure 4 is a plan view of the upper or inner end of the nozzle member.

Figure 5 is a transverse sectional view taken substantially in the plane indicated by line V—V of Figure 1.

Figure 6 is an axial sectional view of another form of valve structure.

Figure 7 is a plan view of the upper or inner end of another form of nozzle member.

Figure 8 is an axial section, similar to Figure 3, showing a modification in which the nozzle member and valve structure are connected together for simultaneous movement in either direction.

Figure 9 is a transverse sectional view taken substantially in the plane indicated by line IX—IX of Figure 8.

The drawing will now be explained.

A beer faucet, designated generally as A has a horizontal portion 1 and an inclined portion 2 which is inclined downwardly and outwardly with respect to the horizontal portion 1.

The body portion 1 is formed with a passageway 3, while the upper portion of the inclined portion 2 is formed with a chamber 4 communicating with the passageway 3 in the part 1. Within the lower end of the part 2 is a passage 5 which is in alignment with the chamber 4 and separated therefrom by a partition 6 which is centrally apertured at 7 to form a valve seat. The upper end of the chamber 4 is open and threaded and receives a threaded plug or cap 8 to close this end of the chamber.

Working within the chamber 4 is a valve structure including a cylindrical hollow stem 9 with both ends open, prior to assembly. Inserted in the lower end 10 of the stem is a valve member 11 of composition material of such characteristics as to make tight sealing engagement with the valve seat 7 and without material deterioration. The valve member 11 is retained within the counterbore by means of a pin 12 extending through a central opening 13 in the valve member 11 and held in place by a transverse pin 14. The outer end of the pin 12 is headed as at 15 to engage the exposed end of the valve member 11 and hold it in place in the stem 9.

The cap 8 is counterbored at 16 to receive the upper end of the stem 9, the bore being sufficiently deep to afford ample surface engagement with the stem to guide it in its reciprocable movement.

For maintaining the valve member against its seat, a spring 19 is utilized, this spring being a coil spring arranged with one end against the bottom 18 of the counterbore 16 and the other end bearing against the transverse pin 14.

A nozzle member B is reciprocable within the passageway 5 and is constructed as a hollow cylinder open at both ends for passage of fluid through it. At its upper or inner end, as illustrated in the drawing, integral cross members 21 and 22 are provided which at their intersection carry a projection 23 arranged in the axis of the nozzle member and adapted normally to engage against the head 15 of the pin 12 of the valve structure.

Between its ends, the outer surface of the nozzle member is formed with an annular groove 24.

Formed as a part of the inclined portion 2 of the body is a boss 25 which has a bored and threaded recess formed in it, extending transversely of the length of the inclined member 2 for receiving a pivot bolt 27. Adjacent the boss, the inclined portion 2 is formed with a side opening 28 which is normally closed by a cover plate 29 held in place by the pivot bolt 27.

A lever 30 has an end portion 31, or leg, arranged to extend into the side opening 28, and carries a head 32 lying within the annulus 24 of the nozzle member B. To the upper end of the lever 30 is applied the usual ball handle 33.

The pivot bolt 27 is provided with a portion 34 which is threaded to engage the threaded counterbored recess 26 of the boss 25, and an intermediate cylindrical portion 35 which receives the lever 30 in pivotal relation for mounting the lever on the body. The cover 29 is provided with an aperture adapted to receive the portion 35 of the pivot bolt. An enlarged head 27 is provided with the usual screwdriver slot for application and removal of the pivot bolt.

The lever 30 may be removed by withdrawing the pivot bolt 27, removing the cover 29, and moving the pivot bolt from engagement with the boss 25. When this has been done, the nozzle member B may be removed from the passageway 5 for cleaning or other attention.

The spring 19, under normal conditions, maintains the valve member 11 seated and because of the existence of the projection 23 of the nozzle member B, the nozzle member is maintained normally in projected or extended position and the handle 33 is held in its normal or inoperative position.

The fact that the valve member works within the chamber 4 avails of the pressure of the beer or other liquid within the passage 3 of the portion 1 and the chamber 4 to augment the holding effect of the spring so that a tight sealing relation is assured.

The relationship of the crank 31 and its pivot pin 27 is such that in order to hold the nozzle member B in its inward or upward position to open passage by unseating of the valve, it is necessary to maintain hand pressure on the handle 33. As soon as hand pressure on the handle 33 is relieved, the spring 19 and the pressure of the liquid within the chamber 4 act to seat the valve and at the same time to project the nozzle member B and to turn the handle 33 to its normal or inactive position.

It will be observed that the faucet of the present invention is one which is of simple construction and arrangement. The body is so fashioned and designed that the passages 3, chamber 4, and passageway 5 may be readily machined, the valve seat 7 easily made, the nozzle member B easily finished to fit, and the valve structure likewise easily finished to fit. The matter of installation of the parts is simple as may be apparent to one skilled in the art to which the present invention appertains.

A gasket 36 is interposed between the upper end of the body portion 2 and the cap 8 to seal the joint therebetween against leakage.

The upper end of the nozzle member, as illustrated, diverges upwardly as to its interior, to form ready entrance for liquid entering the nozzle member through the valve seat when the valve is opened.

The valve structure may be readily removed for cleaning or replacement of parts, by unscrewing the cap 8.

The nozzle member B may be removed for cleaning by withdrawing the pivot bolt 27, removing the cover 29 and lifting out the lever 30, whereupon the nozzle member will drop out of the lower end of the passageway 5.

For attaching the horizontal portion 1 of the body to a supply pipe or to a system in which it is to be used, any suitable means may be employed. The illustrated means includes a head 37 interiorly threaded to receive the threaded end 38 of a connecting pipe. A washer 39 may be interposed in the joint between the body portion 1 and the pipe to prevent leakage.

The portions 3, 4 and 5 constitute a passageway through the valve body for travel of liquid whenever the valve is open or unseated.

The faucet of the present invention is simple in construction, therefore, economical to manufacture. It is positive in action. But a small amount of movement of the nozzle member is necessary to open communication through the faucet, and vice versa, making the faucet extremely quick acting. The valve is opened by positive movement and is closed by spring action. However, construction is such that if the spring were to become inoperative, the pressure of the liquid would be sufficient to close the valve against its seat.

Referring to the valve structure shown in Figure 6, the stem has an upper hollow portion 40 and a lower head portion 41 of greater exterior diameter. The head is counterbored at 42 to receive valve member 43, which is made of the same materials as the valve member 11. Inwardly of the counterbore 42 is a counterbore 44 of less diameter, to receive an end of pin 12a for holding the valve member 43 in place. A cotter pin 45, or a pin like 14, is passed transversely through apertures in the stem, between the portion 40 and the head 41, and through an aperture in the pin 12a, to retain the latter in position. A spring 19a, at one end rests against the bottom of the hollow portion 40, while its other end bears against the bottom of a counterbore in the cap, comparable to the counterbore 16 in the cap 8. It is to be understood that when the valve structure of Figure 6 is used instead of that shown in Figures 2 and 3, the counterbore in the cap will be of such diameter as to receive the portion 40 with a sliding fit, to guide the valve structure in its reciprocable movements.

The shiftable nozzle member B', shown in Figure 7, has a cylindrical interior the diameter of which is substantially that of the opening through the annular valve seat 7. The end of the member B', adjacent the valve seat 7 is not internally flared, as is member B.

Set in notches 46 cut into the inner end of the valve member B' is a bridge piece 47 carrying an axially disposed projection 48 for engagement with the adjacent end of the valve member to unseat it when the nozzle member B' is moved toward the valve seat 7, by actuation of the handle 33.

While the portion 2 of the faucet has been illustrated and described as inclined, it is to be understood that it might be otherwise arranged with respect to the part 1.

The form of the invention illustrated in Figures 8 and 9 is, in general, the same except that the nozzle member B" is positively connected to the valve structure so that these move simultaneously and as a unit.

The nozzle member B" is provided with cross members or bridge pieces 48 which at their intersection support a pin 49 which is threaded.

The valve structure includes a shell 50 counterbored at both ends with an intermediate partition 51 which is axially bored and threaded at 52. The valve member 53 is entered in the counterbore at the lower end of the shell and is held in place by a pin 54 exteriorly threaded to be threaded into the bore 52 of the partition 51. The pin is counterbored and threaded at 55 to receive the pin 49 of the nozzle member B".

In installing the nozzle member B" and the valve structure, the nozzle member is inserted in the chamber 5 below the valve seat partition 6, while the valve structure is inserted in the chamber 4. The pins 49 and 54 are then screwed together an amount to allow axial movement of the connected parts, for opening and closing flow communication through the faucet.

When the arrangement of Figures 8 and 9 is used, it is necessary to prevent rotative movement of either the nozzle member B" or the valve structure in order that these may be connected or disconnected by screw action.

The nozzle member B" is shown as being prevented from rotation.

Cut in the surface of the nozzle member B" is a notch 56 which receives the head 32 of the lever 30. The notch is so cut as to prevent rotative movement of the nozzle member B" when engaged by the head 32. Thus, the valve structure may be connected to or disconnected from the nozzle member by screw action.

As designed, the faucet of the present invention is so arranged that leakage of any fluid will not occur and, furthermore, the parts are so arranged that replacement may be made quickly, also that the whole structure may be quickly disassembled for cleaning and reassembled for use.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A faucet comprising a body having angularly arranged parts forming a passageway for fluid flow, one of said parts being bored to provide two axially arranged chambers open at their outer ends and separated by an internal ring constituting a valve seat, a cap closing the outer end of one of said chambers, said cap having an axial bore inwardly of its inner surface, a valve structure working within said one chamber having a cylindrical hollow stem guided in said cap bore and carrying a valve member within its end adjacent the seat disposed to engage said seat, a pin extending axially through said valve member and into said stem, a crosspin holding said pin in said stem, the outer end of said first pin having a head against said valve member to secure said member in place, a tubular nozzle member endwise shiftably arranged within the other of said chambers and having an end extending outwardly of said other chamber, a lever pivoted to said one part and operative to move said nozzle member towards said valve seat, and said nozzle member having a part engageable with said head of said first pin to unseat said valve when said nozzle member is so moved, the other of said body parts being bored for flow communication with said one chamber of said one part.

2. A faucet comprising a hollow open ended body having inlet and outlet chambers, a valve seat between said chambers defining a flow passageway therebetween, an axially bored end closure for said body at the open end of said inlet chamber, a valve structure in said inlet chamber, a cylindrical hollow stem on said valve structure guided in the bore of said end closure, a valve member in the end of said valve structure adjacent and disposed to engage said seat, a spring in said hollow stem for normally maintaining said valve member against said seat, a flanged pin extending axially through said valve member and into said stem, means for holding said pin in said stem, and movable means within said outlet chamber having a portion engageable with the flange on said pin for unseating said valve member.

FRANK E. RICE.